US012657098B1

(12) United States Patent
Unterberger

(10) Patent No.: US 12,657,098 B1
(45) Date of Patent: Jun. 16, 2026

(54) DATA LOSS MITIGATION IN HOSTED COMPUTING ENVIRONMENTS

(71) Applicant: Amazon Technologies, Inc., Seattle, WA (US)

(72) Inventor: Florian Unterberger, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 195 days.

(21) Appl. No.: 18/744,192

(22) Filed: Jun. 14, 2024

(51) Int. Cl.
| | |
|---|---|
| *G06F 11/00* | (2006.01) |
| *G06F 9/50* | (2006.01) |
| *G06F 11/07* | (2006.01) |
| *G06F 11/20* | (2006.01) |

(52) U.S. Cl.
CPC .......... *G06F 11/203* (2013.01); *G06F 9/5022* (2013.01); *G06F 11/0787* (2013.01)

(58) Field of Classification Search
CPC .......................... G06F 11/203; G06F 11/0787
See application file for complete search history.

(56) References Cited

U.S. PATENT DOCUMENTS

| | | | | |
|---|---|---|---|---|
| 7,882,393 | B2 * | 2/2011 | Grimes ............... | G06F 11/0778 |
| | | | | 714/45 |
| 7,917,811 | B2 * | 3/2011 | Yamamoto .......... | G06F 11/0775 |
| | | | | 714/44 |
| 8,046,641 | B2 * | 10/2011 | Hernandez .......... | G06F 11/0724 |
| | | | | 714/42 |
| 10,530,837 | B2 * | 1/2020 | Bala ...................... | H04L 67/562 |
| 11,442,844 | B1 * | 9/2022 | Peattie ................... | G06F 11/27 |
| 11,539,793 | B1 * | 12/2022 | Karumbunathan ... | G06F 16/178 |
| 11,783,084 | B2 * | 10/2023 | Joshi ................... | G06F 11/3072 |
| | | | | 726/30 |
| 12,511,213 | B2 * | 12/2025 | Mackey ............. | G06F 11/3034 |

* cited by examiner

*Primary Examiner* — Amine Riad
(74) *Attorney, Agent, or Firm* — Knobbe, Martens, Olson & Bear, LLP

(57) ABSTRACT

Systems and methods are provided for managing logging and telemetry data in a cloud provider network including block storage volumes ("disks") and virtual machine instances by scanning data written to the block storage volumes by the virtual machine instances. The disk recycler system can receive configuration information to scan for, obtain, and upload data to logging and telemetry services hosted by the cloud provider network. For example, in the scenario of a virtual machine instance failure, the disk recycler system may upload leftover data from the block storage volume to the relevant logging and telemetry services to avoid gaps in data required by the services of the cloud provider network.

20 Claims, 9 Drawing Sheets

100

CLOUD PROVIDER NETWORK 120

VOLUMES 106

BUCKETS 111

BLOCK STORE
SERVERS 105

INSTANCES 116

OBJECT STORAGE
SERVERS 110

COMPUTE SERVERS
115

NETWORK
104

USER COMPUTING DEVICES 102

DATA LOSS MITIGATION IN HOSTED COMPUTING ENVIRONMENTS

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, set up with elastic resources so that the number of webservers streaming content to users scale up to meet bandwidth requirements during peak viewing hours, and then scale back down when system usage is lighter.

A user typically will pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively static infrastructure of on-premises computing environments, requires a system architecture that can reliably re-allocate its hardware according to the changing needs of its user base.

Cloud service providers can provide computing resources in a variety of forms, which may be combined by users to provide desired functions or services. For example, a cloud provider can provide compute resources, like virtual machines, that conduct computation, block storage resources that act as virtual storage drives (sometimes referred to as "hard drives," "disk drives," or the like) for compute resources, object storage services that act as network-accessible data stores, and the like. A cloud service provider may manage the underlying hardware supporting such services, such that an end user need not do so. For example, a cloud service provider may use a variety of hardware to implement services that ensure the security and reliability of compute and block storage resources, such as logging and telemetry services. The cloud service provider may also implement backup and redundancy measures to ensure the proper data reaches these logging and telemetry services, such as a disk recycling system for logging and telemetry data. These changes are typically opaque to the end user, relieving the end user of dealing with issues such as the maintenance, organization, and security of crucial logging and telemetry data. Cloud computing can thus significantly simplify development and deployment of computing processes.

DETAILED DESCRIPTION

Figure 1:
FIG. 1 depicts a schematic diagram of a cloud provider network in which various embodiments according to the present disclosure can be implemented.

Generally described, aspects of the present disclosure relate to providing a disk recycler system associated with the maintenance of logging and telemetry data of virtual machine instances written to block-storage volumes in distributed computing environments. Virtual machines or compute instances are often used to process requests and generate log data, security events, and operational metrics. This data is typically written locally to a storage volume attached to the compute instance, with the intent to asynchronously upload or "push" the data to remote logging, security, and monitoring services. Such data can be written to a block storage volume, for example, which can generally correspond to a network resource that acts as a virtualized storage drive for a computing instance, such as a VM instance, enabling the VM instance to read from and write to the volume as if the volume were physically coupled to it. A VM instance may write logging and telemetry data to a block storage volume (hereafter called a "disk") and then also asynchronously transmit this logging and telemetry data to the relevant logging and telemetry services of the cloud service provider (hereafter referred to as "relevant services"). However, if the compute instance fails or is stopped unexpectedly, any data that has not yet been pushed to these relevant services may be lost permanently when the local storage volume is deleted. This can result in incomplete log files, missing security events, and gaps in operational metrics, which can hinder debugging, security analysis, and system monitoring efforts.

The above challenges, among others, are addressed by the disclosed disk recycler system that dynamically captures and reliably delivers logging and telemetry data from a VM instance to relevant services, even in the event of a VM instance failure. When a compute instance fails or is otherwise suddenly stopped, instead of deleting the attached storage volume, the storage volume can be provided to the disclosed disk recycler service. The disclosed disk recycler then scans the storage volume for any log data, security events, or operational metrics that have not yet been pushed to their respective remote services. The disclosed disk recycler can then reliably push this "leftover data" to the appropriate logging, security, and monitoring services, ensuring that no data is lost due to the compute instance failure or stoppage. After pushing the data, the disclosed disk recycler can safely delete the storage volume. This service aims to increase the reliability and completeness of data pushed to critical services, reducing the effort required to reconstruct missing events and ensuring that security-relevant data is not lost.

As discussed herein, the use of a disk recycler system to capture logging and telemetry data written to a disk in the event of a VM instance failure beneficially avoids loss of security-critical logging and telemetry data used by relevant services of a distributed computing environment such as a cloud provider network. Moreover, embodiments of the present disclosure can be particularly beneficial in automating, streamlining, and systematizing the process of handling VM instance failures across the many different teams required for the operation of a cloud provider network at scale. In this way, customer security concerns as well as organizational frustrations and inconsistencies at the cloud provider level may be reliably addressed.

As disclosed herein, a cloud computing environment can provide both compute and storage resources that end users of the environment may utilize to conduct computing operations. For various reasons, such as increases in efficiency and resiliency, the cloud computing environment may logically separate compute and storage resources. For example, compute resources may be provided in the form of instances-either virtual or physical-providing computational processing capabilities. While instances may have limited amounts of local physical persistent storage, they may operate primarily based on network-accessible persistent storage. In the context of the present disclosure, such storage can include a network-accessible block storage volume or "disk." The disk is illustratively hosted on a host device (a "volume host") that is in networked communication with the instances. In one embodiment, the disk is locally addressable by the instances, even while the disk is not physically local to the instance. For example, each instance may include hardware or software (referred to herein generally as a "storage client") that accepts I/O operations to the volume via a local mass storage protocol, such as Serial ATA ("SATA") and translates the operations into network communications to a remote, network-attached volume host hosting the disk. The client may further obtain responses from the volume host, translate the responses appropriately, and return the translated responses to the instance. Thus, an instance may appear to operate in a manner similar to a local physical machine (e.g., with a local mass storage volume), but in reality be implemented by distinct cloud services providing compute and storage capabilities.

As noted above, it is within such a context that a customer of a cloud provider network may elect to make use logging and telemetry services offered by the cloud services provider. Such logging and telemetry services are integrated with the resources of the cloud provider network and may even be implemented with the same types of network resources (e.g., VM instances) provided for customer use. Logging and telemetry services may serve any number of purposes for customers, ranging from security-critical (e.g., auditing, governance, and compliance data that may be quickly filtered, searched, and exported according to particular visibility needs of the customer) to relatively mundane (e.g., operating system logs used for debugging purposes).

Within normal operation of the logging and telemetry services of a cloud provider network, events, logs, and metrics of a particular VM instance may be written to the instance's corresponding disk. Additionally, such logging and telemetry data (hereafter "LAT" data) may be asynchronously pushed by the VM instance to the relevant services elsewhere in the cloud that make use of the data. As will be described in further detail within this disclosure, various issues may arise that may interrupt this normal operation of a VM instance asynchronously pushing data to relevant services. These issues may include total failure of the VM instance resulting in a cessation of all expected activity from the instance, or in other cases, a "partial" failure of the VM instance in which the instance continues to write data to the disk but does not succeed in its asynchronous LAT data push. No matter what the cause for the interruption of the normal flow of LAT data from the VM instance to the relevant services, the implications can be serious for both the customer and the cloud services provider.

While it is not common for a VM instance of an established cloud services provider to fail to properly provide LAT data to relevant services, such cloud services providers operate at such massive scales that even unlikely failure events may happen on rare occasion. Even though such failures may be relatively rare, when a failure does occur, its impact on the customer can be severe and irreparable to due to the consequences of data gaps in security-critical activity logs of a failed VM instance used by a customer.

In fact, the rarity of VM instance failures is a contributing factor in the lack of certain organization-wide process and automation surrounding such failure at the cloud-services provider level. Each individual cloud services provider team impacted by a failure may find themselves manually developing custom infrastructure and solutions to solve for this unlikely but burdensome contingency due to its severe urgency in the unlikely scenarios when such a failure arises. Teams may find themselves putting their daily tasks on hold to instead spend their time puzzling together event logs from other various sources of data with varying degrees of accuracy and success. Rather than being able to focus organizational and team resources on intended tasks, VM instance failure in the absence of an organization-wide disk recycler solution leaves individual teams building manual custom solutions, inevitably result in inconsistent, unreliable, and redundant efforts to solve the same problem team by team. Such inefficiency is not only costly to the cloud services provider but also damaging to the morale of the individual teams left handling the issue without an organization-wide disk recycling solution.

As noted above, beyond any organizational frustration or inefficiency that may occur within teams of the cloud services provider due to a lack of a disk recycler system, the most severe implications of a lack of a disk recycler system lie with the customer. Specifically, a customer opened up to security risk and compromise due to data gaps in security-critical activity logs of a failed VM instance may suffer their own internal consequences ranging from vulnerability to bad actors and cyber-attacks, increased cost in attempts to remedy a security breach, inefficiencies resulting from being required to turn organizational resources towards the problem of the security failure. Any such experience of a customer inevitably results in the erosion of customer trust in the cloud services provider, customer attrition from the cloud services provider, costs for the cloud services provider in the attempt to make the customer whole again, and ultimately the erosion of the brand and reputation of the cloud services provider at large.

While the various manual techniques described above exist for attempting to address gaps in LAT data of a VM instance, these techniques are problematic at best, particularly in the context of distributed cloud services providers. Accordingly, these approaches can be insufficient to handle overloading, particularly at scale. Embodiments of the present disclosure address these problems by providing a scalable disk recycler system enabling comprehensive, reliable, and secure transfer of LAT data from each VM instance in the cloud provider network to the respective services, regardless of VM instance failure or health. Specifically, as disclosed herein, a cloud provider may use a disk recycler system to address particular VM instance failures, spinning up a disk recycling solution to address a particular disk containing leftover LAT data that did not get asynchronously pushed to respective services by the VM instance for any number of reasons. In other embodiments, a cloud provider may use a disk recycler system as a comprehensive service to continuously (or periodically) obtain the data written by VM instances onto disks across the cloud provider network. Beneficially, such embodiments may remove the need for VM instances to conduct an asynchronous LAT data push to respective services altogether, instead replacing the task with the dedicated disk recycling system obtaining LAT data from disks at regular intervals.

Notably, the techniques in these various embodiments of the disclosed disk recycling system avoid the drawbacks of prior techniques. Specifically, the security and reliability of customer LAT data is vastly increased due to lack of gaps in logs and metrics (even in the unlikely event of a VM instance failure). Such techniques reduce occurrence of security incidents impacting cloud customers, which in turn reduces the chance for negative customer experiences, which in turn reduces the risk to the overall attrition of customers and reputational harm to the cloud service provider. Further, the massive scale of the operations of the cloud provider network are streamlined, simplified, and more efficient; the previous manual efforts to piece together missing LAT data and logs are replaced by an accurate and comprehensive disk recycler system used across all cloud services provider teams. In this way, not only are the customers more satisfied and secure, but teams working within the organization of the cloud services provider are freed to focus on their daily tasks. These teams no longer are forced to endure the frustration of high-alert security incidents requiring manual intervention on a team by team basis to address problems with custom solutions for LAT data reconstruction that, before the introduction of the present disk recycler solution, were at best incomplete, and at worst, impossible altogether.

As will be appreciated by one of skill in the art in light of the present disclosure, the embodiments disclosed herein improve the ability of computing systems, such as cloud computing systems providing logging and telemetry services for virtual machine instances writing data to block storage volumes, to implement such services in a manner such that neither the customers of the cloud services nor the teams maintaining the cloud services are negatively impacted. Moreover, the presently disclosed embodiments address technical problems inherent within computing systems; specifically, the inherent limitations of computing resources used to log events, activities, and metrics for customer use in logging and telemetry services of a distributed computing environment. These technical problems are addressed by the various technical solutions described herein, including the use of a scalable disk recycler system implemented in the context of a cloud provider network. Thus, the present disclosure represents an improvement on large scale computing systems providing logging and telemetry services for virtual machine instances writing data to block storage volumes, and computing systems in general. Further, the present disclosure is not limited only to LAT data involved with logging and telemetry services, but instead may be an applicable improvement to any service that writes data to a disk with a VM instance. The present disclosure is similarly not limited to VM instances, but could instead extend to improve upon other execution environments, such as software-based virtualization containers.

The foregoing aspects and many of the attendant advantages of this disclosure will become more readily appreciated as the same become better understood by reference to the following description, when taken in conjunction with the accompanying drawings.

FIG. 1 depicts an example computing environment 100 including a cloud provider network 120 in which embodiments of the present disclosure can be implemented. The cloud provider network 120 can be accessed by user computing devices 102 over a network 104. A cloud provider network (sometimes referred to simply as a "cloud"), refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 120 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In FIG. 1, the cloud provider network 120 includes one or more block storage servers 105, one or more object storage servers 110, and one or more compute servers 115 that are in networked communication with one another and with the network 104 to provide users with on-demand access to computing resources including volumes 106, buckets 111, and instances 116, among others. These particular resources are described in further detail below. Some implementations of cloud provider network 120 can additionally include domain name services ("DNS") servers, relational database servers, and other server configurations (not illustrated) for supporting on-demand cloud computing. Each server includes hardware computer memory and/or processors, an operating system that provides executable program instructions for the general administration and operation of that server, and a computer-readable medium storing instructions that, when executed by a processor of the server, allow the server to perform its intended functions.

The cloud provider network 120 can provide on-demand, scalable computing services to users through the network 104, for example allowing users to have at their disposal scalable "virtual computing devices" via their use of the block storage servers 105, object storage servers 110, and compute servers 115. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider network 120 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Turning specifically to the roles of the different servers within the cloud provider network 120, the compute servers 115 include one or more servers on which provide resizable computing capacity to users for building and hosting their software systems. The compute servers 115 and associated control plane functionality can provide an elastic compute cloud service of the cloud provider network. Compute services can be referred to as a virtual compute service, or cloud compute service, in various implementations. Users can use the compute servers 115 to launch as many virtual computing environments, referred to as virtual compute instances, virtual machine instances, virtual machines, or "instances" 116, as they need. Instances 116 can have various configurations of processing power, memory, storage, and networking capacity depending upon user needs. The compute servers 115 can also include computer storage for temporary data used while an instance is running, however as soon as the instance is shut down, this data is lost.

The block storage servers 105 provide persistent data storage for the compute servers 115 in the form of block storage volumes 106, each of which represents a virtualized, network-accessible block-storage device (e.g., a virtual "hard disk"). In the present disclosure, the use of the term "disk" is intended to convey the functionality historically associated with physical disks (e.g., persistent mass data storage); notably, the use of the term does not imply the presence of a physical "disk." For example, a solid-state storage device lacking a physical "disk" may nevertheless be referred to as a "disk" within the context of this disclosure. Block storage may be referred to in various implementations as cloud disks service, a managed disk service, a storage area network service, a persistent disk service, or a block volumes service, while block storage volumes may variously be referred to as cloud disks, storage disks, cloud volumes, disks, block volumes, or simply "volumes." The block storage servers 105 and associated control plane functionality can provide an elastic block store service of the cloud provider network 120. Data of volumes 106 may be encrypted or unencrypted.

The block storage servers 105 include one or more servers on which data is stored as blocks. A block is a sequence of bytes or bits having a fixed length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data (also referred to herein as a "data block") can be, for example, 512 bytes, 1 kilobyte ("kB"), 4 kB, 8 kB, 16 kB, 32 kB, 64 kB, 128 kB, 256 kB, 512 kB, or larger, depending upon the implementation.

Volumes 106, which can be treated as an individual hard drive ranging for example from 1 GB to 1 terabyte TB (or more) in size, are made of one or more blocks stored on the block storage servers 105. Although treated as an individual hard drive, it will be appreciated that a volume may be stored as one or more virtualized devices implemented on one or more underlying physical host devices. Volumes 106 may be partitioned a small number of times (e.g., up to 16) with each partition hosted by a device of the cloud provider network 120 that has the ability to transfer data at around 1 GB per second ("Gbps") in some implementations. These volumes provided persistent, dedicated storage that can be attached to particular instances of the compute servers 115. Each volume may be "attached" to an instance 116 running on a compute server 115, and can be detached from that instance 116 and re-attached to another. Attachment between a volume and an instance refers to the establishment of a connection between a client of the instance and the volume. This connection may be referred to as a "lease" in some implementations, and it enables to instance to view the volume as if it were a local storage drive, even though the volume and instance may be hosted on different physical machines and communicating over a network. Attachment may be facilitated, for example, by specialized hardware or software executing on compute servers 115 (which specialized hardware or software is sometimes referred to as a block storage server "client") that operates to obtain mass storage operations (e.g., according to the Serial AT Attachment (SATA) protocol or other known storage protocols) and pass corresponding operations to the block storage servers 105 for implementation, such that it appears from the point of view of an instance 116 that volumes 106 represent local disk drives. The client may be implemented on an offload card of a server that includes the processing units (e.g., CPUs or GPUs) of the compute instance. For example, in some implementations, at least a subset of virtualization management tasks may be performed at one or more offload cards so as to enable more of the processing capacity of the host to be dedicated to client-requested compute instances—e.g., cards connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management, input/output virtualization to network-attached storage volumes, local migration management tasks, instance health monitoring, and the like. The block storage servers 105 may have built-in redundancy for volumes by replicating the volume across multiple servers within an availability zone, which means that volumes will not fail if an individual drive fails or some other single failure occurs.

The object storage servers 110 represent another type of storage within the cloud provider network 120. The object storage servers 110 and associated control plane functionality can provide an object-based storage service of the cloud provider network. Object-based storage services can be referred to as a blob storage service, cloud object storage service, or cloud storage service, in various implementations. In contrast to block-based storage (e.g., where devices read and write fixed-length blocks identified by a location, such as a logical block address (LBA)), object storage services 110 facilitate storage of variable-length objects associated with a corresponding object identifier. Each object may represent, for example, a file submitted to the servers 110 by a user for storage (though the servers 110 may or may not store an object as a file). In contrast to block-based storage, where input/output (I/O) operations typically occur via a mass storage protocol like SATA (though potentially encapsulated over a network), interactions with the object storage servers 110 may occur via a more general network protocol. For example, the servers 110 may facilitate interaction via a Representational State Transfer (REST) application programming interface (API) implemented over the Hypertext Transport Protocol (HTTP). The object storage servers 110 may store objects within resources referred to as buckets 111. Each object typically includes the data being stored, a variable amount of metadata that enables various capabilities for the object storage servers 110 with respect to analyzing a stored object, and a globally unique identifier or key that can be used to retrieve the object. Objects stored on the object storage servers 110 are associated with a unique identifier, such that authorized access to them can be obtained through requests from networked computing devices in any location. Each bucket 111 is associated with a given user account. Users can store as many objects as desired within their buckets, can write, read, and delete objects in their buckets, and can control access to their buckets and the objects contained therein. Further, in embodiments having a number of different object storage servers 110 distributed across different ones of the regions described above, users can choose the region (or regions) where a bucket is stored, for example to optimize for latency. Users can use object storage servers 110 for purposes such as storing photos on social media websites, songs on music streaming websites, or files in online collaboration services, to name a few examples. Applications developed in the cloud often take advantage of the vast scalability and metadata characteristics of the object storage servers 110. The object storage servers 110 can support highly parallel data accesses and transfers. The object storage servers 110 can offer even greater redundancy than the block storage servers 105, as the object storage servers 110 can automatically replicate data into multiple availability zones. The object storage servers 110 also have different data throughput than the block storage servers 105, for example around 20 Mbps for a single stream of data.

While the object storage servers 110 can be used independently from the instances 116 and volumes 106 described above, they can also be used to provide data backup with respect to object-based snapshots (e.g., object-stored backups of volume data). For example, data of a volume 106 may be represented as one or more objects stored within the object storage servers 110 (with each object representing one or more blocks of the volume 106) along with one or more manifests identifying the objects. Together, the objects and manifests can logically represent a point-in-time representation of the volume 106 referred to as an object-based snapshot.

As illustrated in FIG. 1, the cloud provider network 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. User computing devices 102 can include any network-equipped computing device, for example desktop computers, laptops, smartphones, tablets, e-readers, gaming consoles, and the like. Users can access the cloud provider network 120 via the network 104 to view or manage their data and computing resources, and/or use websites and/or applications hosted by the cloud provider network 120. Further, users may access the cloud provider network 120 via the network 104 with a user computing device 102 to generate LAT data (e.g., through use of object storage buckets 111 or block storage volumes 106 in combination with compute instances 116). In the context of such user activities, there may be a remote possibility (e.g., due to a failure of a compute instance 116) that the LAT data generated by such user activities is not properly pushed to the logging and telemetry services of the cloud provider network 120. In such a scenario in which a failure occurs, manual processes and techniques may be unable to properly remedy missing data not properly pushed to respective services. However, as discussed in more detail below, a disk recycler system may address such a scenario at any scale with reliability, mitigating the risk posed by missing data going unreported to the appropriate logging and telemetry services.

Figure 2:
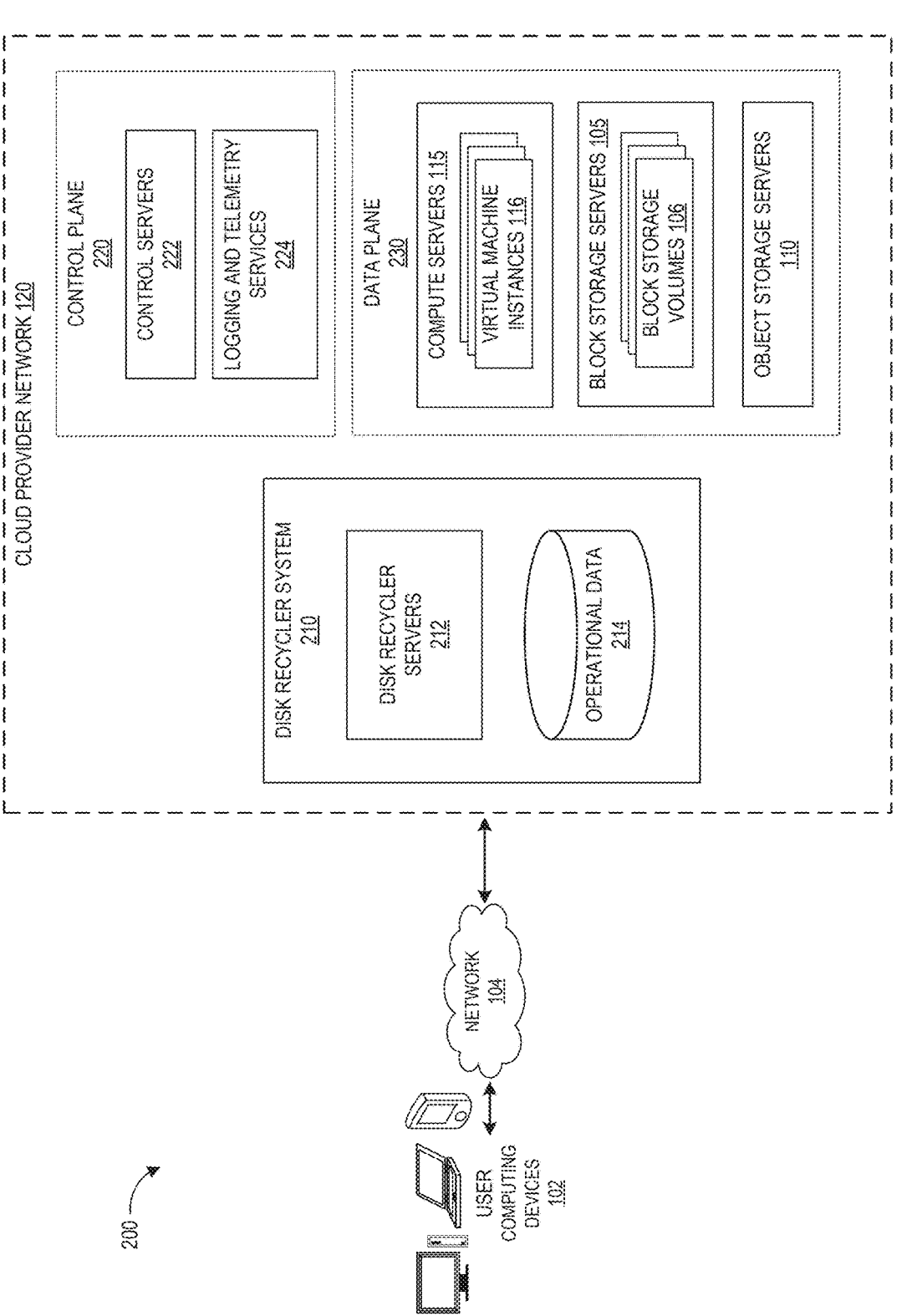
FIG. 2 depicts a schematic diagram of a network environment in which the cloud provider network of FIG. 1 implements a scalable disk recycler system in accordance with aspects of the present disclosure.

Turning now to FIG. 2, a computing environment 200 is depicted in which a disk recycler system 210 is implemented on the cloud provider network 120. The traffic and operations of the cloud provider network 120 depicted in FIG. 2 substrate may broadly be subdivided into two categories in various embodiments: control plane traffic carried over a logical control plane 220 and data plane operations carried over a logical data plane 230. While the data plane 230 represents the movement of user data through the cloud provider network 120, the control plane 220 represents the movement of control signals through the cloud provider network 120. The control plane 220 generally includes one or more control plane components distributed across and implemented by one or more control servers 222. Control plane traffic generally includes administrative operations, such as establishing isolated virtual networks for various clients, monitoring resource usage and health, identifying a particular host or server at which a requested compute instance is to be launched, provisioning additional hardware as needed, and so on. Notably with respect to the present disclosure, the control plane 220 may contain logging and telemetry services 224, which provide the customer and the cloud provider network 120 with the ability to view searchable, filterable, fine-grained data and detail regarding activity occurring on cloud network resources such as virtual machine instances 116. Logging and telemetry services 224 may provide security-critical information that allows administrators and executives to ensure resources are utilized by intended parties for intended purposes. For example, logging and telemetry services 224 may use data such as log data and telemetry data to provide metrics, reports, analytics, and other similar output required for governance and compliance. This data may be provided to the logging and telemetry services by the resources utilized by the customer (e.g., a virtual machine instance 116 provides time-stamped data with user IDs and user activity to the logging and telemetry service 224 in an asynchronous push after writing this data to a block storage volume, as will be discussed in further detail later in this disclosure.)

Meanwhile, the data plane 230 generally includes one or more data plane components distributed across and implemented by one or more data plane servers, such as compute servers 115, block storage servers 105, and object storage servers 110. The data plane 230 includes customer resources that are implemented on the cloud provider network 120 (e.g., virtual machine instances 116, containers, block storage volumes 106, databases, file storage, etc.). Data plane traffic generally includes non-administrative operations such as transferring data to and from the customer resources.

Certain control plane components (e.g., tier one control plane components such as the control plane for a virtualized computing service) are typically implemented on a separate set of servers from the data plane components, while other control plane components (e.g., tier two control plane components such as analytics services) may share virtualized servers with data plane components. Resources of the control plane can be provisioned in an account (or accounts) of the cloud provider, while resources of the data plane 230 can be provisioned in respective user accounts.

Control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 230 can include one or more compute servers 115, which may be bare metal (e.g., single tenant) or may be virtualized by a hypervisor to run multiple VM instances 116 (sometimes referred to as "instances") for one or more clients. These compute servers 115 can support a virtualized computing service of the cloud provider network 120. The cloud provider network 120 may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a client, e.g., based (at least in part) on input from the client. For example, a client may choose an instance type from a predefined set of instance types. As another example, a client may specify the desired resources of an instance type and/or requirements of a workload that the instance will run, and the instance type selection functionality may select an instance type based on such a specification.

The data plane 230 can also include one or more block storage servers 105, which can include persistent storage for storing block storage volumes 106 of client data as well as software for managing these block storage volumes 106. These block storage servers 105 can support a managed block storage service of the cloud provider network 120. The block storage servers 105 include one or more servers on which data is stored as blocks, as previously discussed above. Replicas of a block storage volume 106 in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (I/O operations) at the block storage volume 106, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. A VM instance 116 can virtualize its I/O to a block storage volume 106 by way of a client. The client represents instructions that enable a VM instance 116 to connect to, and perform I/O operations at, a remote data volume (e.g., a data volume stored on a physically separate computing device accessed over a network).

The data plane 230 can also include one or more object storage servers 110, which represent another type of storage within the cloud provider network 120. As previously discussed above, the object storage servers 110 include one or more servers on which data is stored as objects within buckets 111 and can be used to support a managed object storage service of the cloud provider network 120.

The disk recycler system 210 can implement a variety of tasks with respect to logging and telemetry data ("LAT data") that is sent to the logging and telemetry services 224. LAT data may be written to the block storage volumes 106 by virtual machine instances 116, reflecting the activity and operations occurring on such virtual machine instances 116. As previously discussed, the LAT data reflecting this activity may then be asynchronously pushed by the virtual machine instances 116 to logging and telemetry services 224 for use in auditing, governance, compliance, or other relevant administrative purposes.

More broadly, a disk recycler system 210 is not limited to LAT data. Rather, a disk recycler system 210 may deal with any data written to or stored on a disk by a virtual machine instance. For purposes of this disclosure, data in this broad sense will be referred to as "operational data," and any reference to LAT data can also apply more broadly to any type of operational data. For example, operational data can include log data, metrics, analytical data, or any other data regarding operation of the machine. Once operational data is written to the block storage volumes 106, the disk recycler system may run tasks with its disk recycler servers 212 (a specific implementation of compute servers 115, in some embodiments) that capture leftover or missing operational data left on block storage volumes 106 that did not get asynchronously pushed by the virtual machine instance 116 to the logging and telemetry service 224. Upon capturing such missing operational data, the disk recycler system 210 may store it as operational data 214. The operational data 214 may be stored, for example, as object data in object storage servers 110. In alternative embodiments, operational data 214 may be stored as data within a relational database or other formats such as file storage in a file server. The disk recycler system task may then upload the missing operational data to the logging and telemetry services 224 before deleting the operational data from the block storage volume 106 and recycling the block storage volume 106. In some embodiments, the disk recycler system 210 may be partially or completely within the control plane 220 and/or the data plane 230.

The above-noted logging and telemetry services and the associated tasks of the disk recycler system 210 can be very important for proper operation of the network 120 as a whole (e.g., to ensure security and reliability of resources provided to customers of the cloud provider network 120, as well as traceability of resource outages, failures, and errors through robust logging and metrics).

Figure 3A:
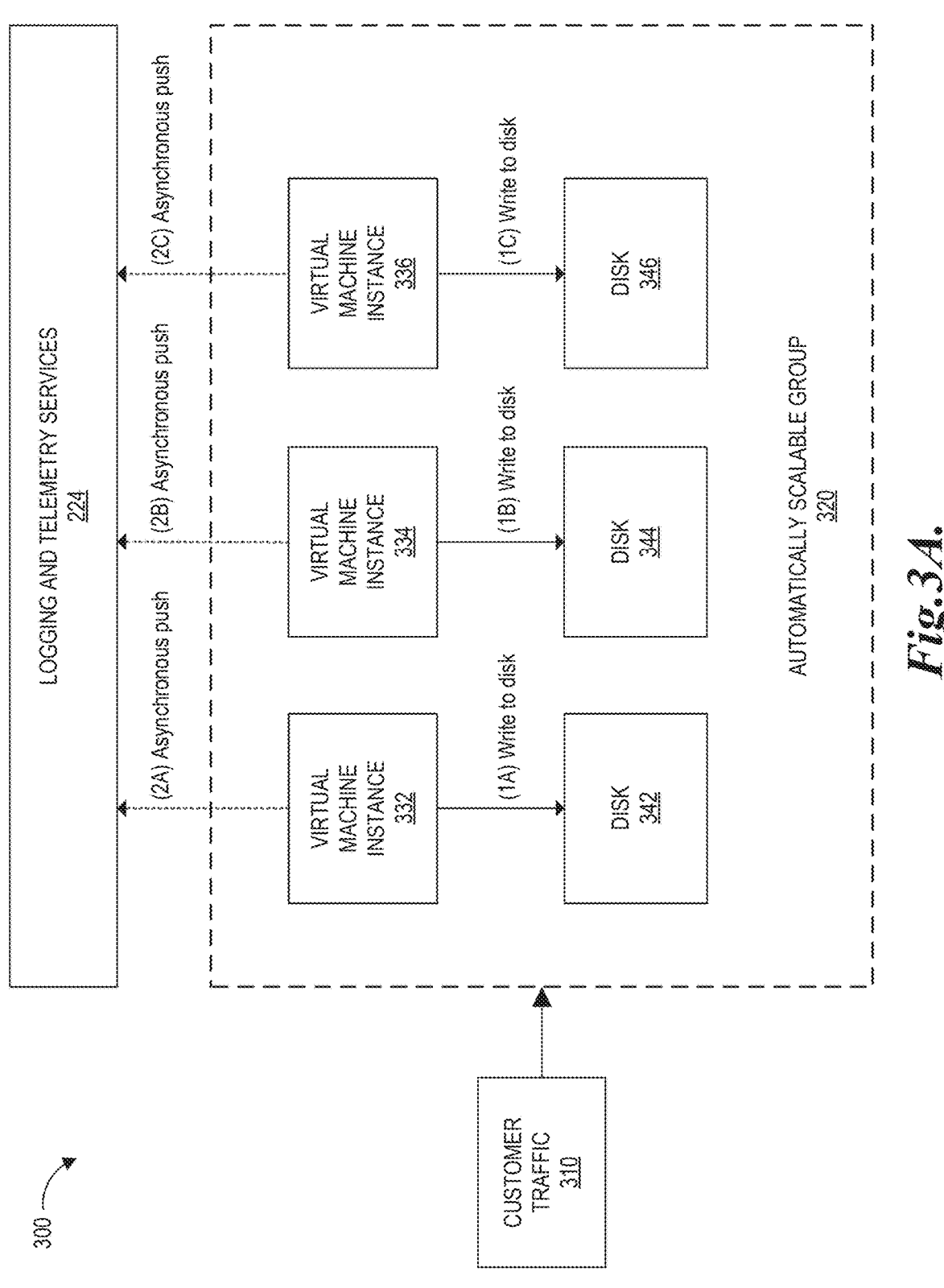
FIG. 3A depicts illustrative interactions in a properly functioning exemplary system for writing log and telemetry data from virtual machine instances to block storage volume disks, as well as asynchronously pushing the log and telemetry data from the virtual machine instances to relevant services, according to embodiments of the present disclosure.

Moving to FIG. 3A, the standard expected functioning of an exemplary system 300 depicts illustrative interactions for writing LAT data from VM instances 116 to block storage volumes 106 (hereafter "disks") and asynchronously pushing the LAT data from the VM instances 116 to relevant logging and telemetry services. In order to properly contextualize the functions of a disk recycler system 210 according to embodiments of the present disclosure, the flow of LAT data in a cloud provider network 120 without the assistance of a disk recycler system 210 must first be demonstrated.

As shown in FIG. 3A, the standard flow of LAT data in a cloud provider network 120 without the assistance of a disk recycler system 210 begins at (1A), in which VM instance 332 writes data, including LAT data, to disk 342 (which as previously discussed can be understood to be a block storage volume 106, along with disk 344 and disk 346). In a mirrored process at (1B), VM instance 334 writes data, including LAT data, to disk 344. Again at (1C), VM instance 336 writes data, including LAT data, to disk 346. The data written to individual disks 342, 344, and 346 reflects the customer traffic 310 of the cloud provider network 120 flowing through individual VM instances 332, 334, and 336, respectively. At (2A), VM instance 332 then asynchronously pushes the data reflective of its customer traffic 310 (including LAT data) to the appropriate logging and telemetry services 224 of the cloud provider network 120. At (2B), just like at (2A), VM instance 334 asynchronously pushes the data reflective of its customer traffic 310 (including LAT data) to the appropriate logging and telemetry services 224 of the cloud provider network 120. At (2C), VM instance 336 also asynchronously pushes the data reflective of its customer traffic 310 (including LAT data) to the appropriate logging and telemetry services 224 of the cloud provider network 120. Notably, VM instances must each take these two separate steps with the same LAT data (e.g. step "(1A)" writing LAT data to disk, and step "2(A)" asynchronously pushing LAT data to logging and telemetry services 224) because the LAT data serves different purposes at these different locations. While the LAT data is written to a disk (e.g., disk 342) because this disk is serving as the virtual cloud services equivalent of a local mass storage volume, the LAT data is pushed to the logging and telemetry services 224 because it is being used for administrative and reporting purposes such as compliance, governance, and security.

Because these three exemplary VM instances 332, 334, and 336 (and their respective disks) are found within an automatically scalable group 320, any number of VM instances corresponding to any number of disks could be included in exemplary system 300. For purposes of illustration, three example instances and disks are included, but due to the massive scale of some cloud provider networks 120, the true functioning of an automatically scalable group 320 is best appreciated as a group of extremely numerous resources that can be quickly provisioned according to customer demand. It is within the ability to scale resources up and down quickly within the cloud provider network 120 that a customer may find key benefits to such an environment.

Figure 3B:
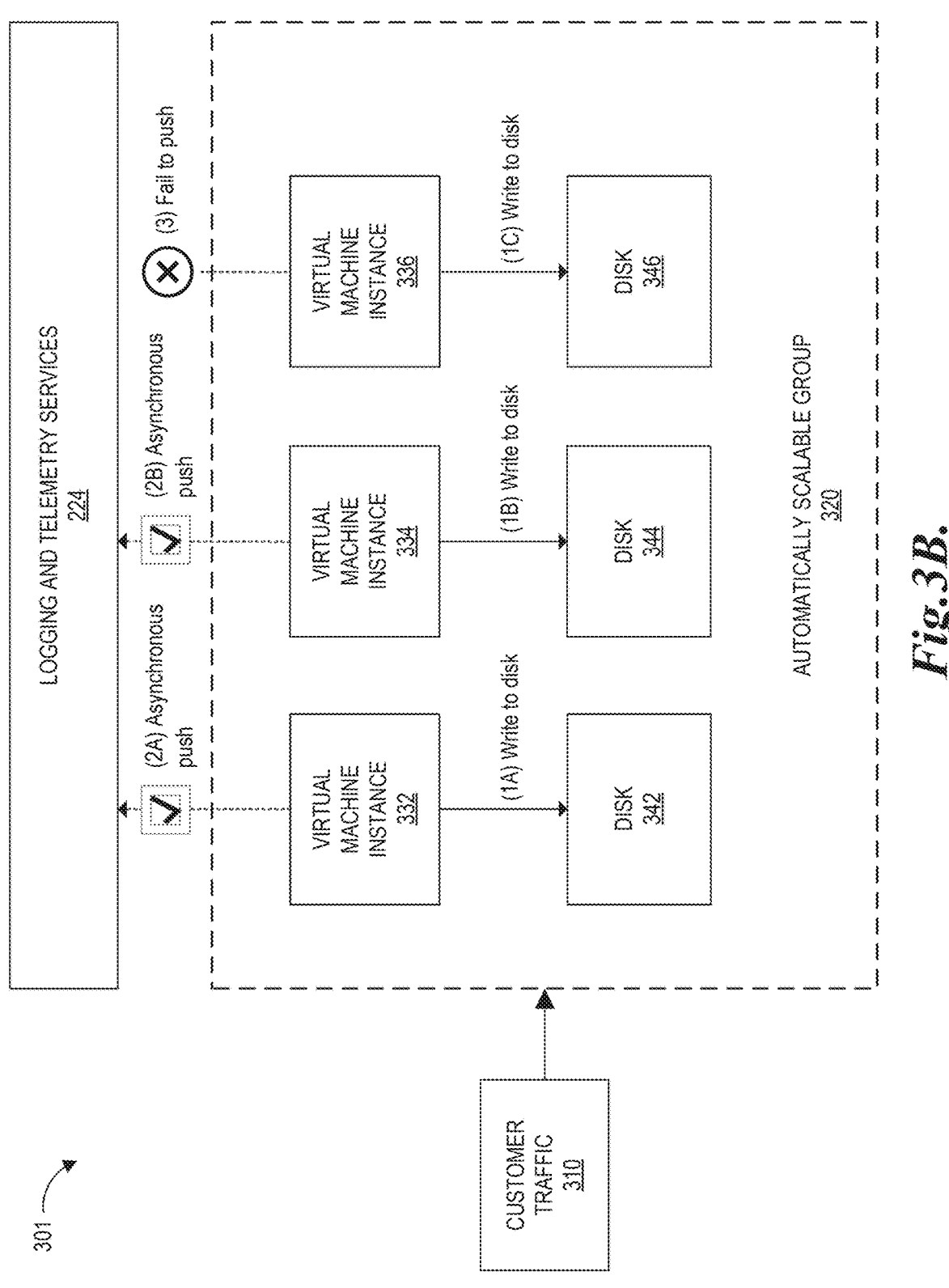
FIG. 3B depicts illustrative interactions in a system experiencing a first type of failure, namely a failure to asynchronously push log and telemetry data from the virtual machine instances to relevant services, even while the system continues to write log and telemetry data from virtual machine instances to block storage volume disks, providing a depiction of one of the issues solved by embodiments of the present disclosure.
Figure 3C:
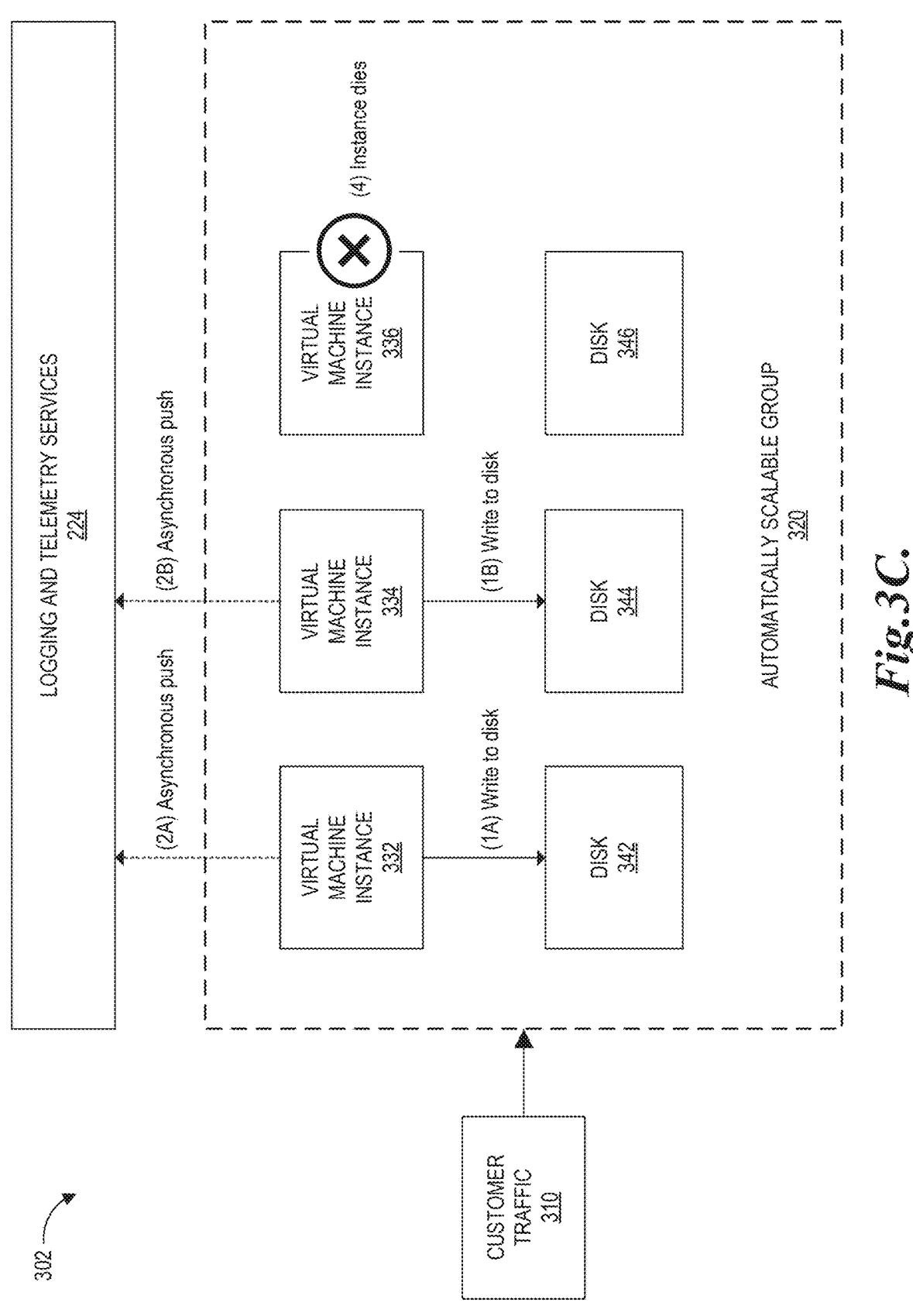
FIG. 3C depicts illustrative interactions in a system experiencing a second type of failure, namely a failure to write log and telemetry data from virtual machine instances to block storage volume disks while also failing to asynchronously push log and telemetry data from the virtual machine instances to relevant services, providing a depiction of another issue solved by embodiments of the present disclosure.

However, as the following FIG. 3B and FIG. 3C will depict, the massive scalability of the cloud provider network 120 can also occasionally (if rarely) cause issues in the normal flow of LAT data through the cloud provider network 120 as just discussed in FIG. 3A in the absence of a disk recycler system 210.

As shown in FIG. 3B, the standard flow of LAT data in a cloud provider network 120 is interrupted by a failure to asynchronously push data by one of the VM instances. System 301 of FIG. 3B thus begins at (1A) and (1B), which are steps identical to the previously described steps (1A) and (1B) of FIG. 3A; both VM instances 332 and 334 write data to their respective disks 342 and 344 as expected. At (1C), VM instance 336 is still able to receive customer traffic 310 and also is able to write to its disk 346 (as in FIG. 3A). However, in FIG. 3B, while VM instances 332 and 334 successfully achieve asynchronous pushes (2A) and (2B) of their data to services 224, VM instance 336 encounters a problem. Specifically, at (3), VM instance 336 fails to asynchronously push the data it wrote to disk 346 along to the appropriate logging and telemetry services 224 of the cloud provider network 120. In this way, (3) exemplifies one type of trigger event/failure that could be remedied or otherwise avoided with a disk recycler system 210 of the present disclosure. However, because no disk recycler system 210 is present in FIG. 3B, the logging and telemetry services 224 will suffer from an LAT data gap in their metrics and logs, which could result in any number of the serious consequences to the customer and the cloud service provider discussed earlier in this disclosure. For example, the resulting LAT data gap from the failure at (3) could mean that security-critical knowledge of customer traffic 310 at VM instance 336 could be lost and thus unreported to the customer. This opens the customer up to a number of security risks including, but not limited to, the malicious behavior of bad actors. As discussed in more detail below, a disk recycler system 210 could mitigate this failure event at (3) in a number of different ways.

Moving to the illustrative interactions depicted in FIG. 3C, the standard flow of LAT data in a cloud provider network 120 is again interrupted, this time by a different type of failure: a VM instance dying unexpectedly. System 302 of FIG. 3C thus begins at (1A) and (1B), which are again identical to the previously described steps (1A) and (1B) of FIG. 3A; both VM instances 332 and 334 write their data to their respective disks 342 and 344 as expected. Again at (2A) and (2B), VM instances 332 and 334 successfully make their respective asynchronous pushes (2A) and (2B) of data reflecting customer traffic 310 to the logging and telemetry services 224. However, at (4), VM instance 336 dies unexpectedly while performing its normal functioning. Herein lies another type of trigger event/failure: when VM instance 336 dies, it may leave leftover data (including LAT data) written on disk 346 that it never got the chance to asynchronously push to the appropriate logging and telemetry services 224. In contrast to the architecture of a traditional server in which the compute and disk resources may be co-located, the architecture of the cloud provider network 120 in which a disk recycler system 210 may be implemented carries important implications about the use and (recycled) reuse of disks such as disk 346. Specifically, the cloud provider network 120 can separate the compute (e.g., VM instance 336) and the disk (e.g., disk 346) such that the failure of VM instance 336 does not render the disk 346 inaccessible. In this way, the data from disk 342 may still be captured after the death of VM instance 336 (according to the following steps of the disk recycler system discussed below), and then disk 346 can be recycled and reused in conjunction with a new VM instance.

Notably however, upon the death of VM instance 336 at (4), no further customer traffic 310 is received at the VM instance 336 and no further data is written to the disk 346. Even still, because of the asynchronous nature of the data pushes performed by VM instance 336, data written to disk 346 before the death of VM instance 336 may get left on disk 346 if the death of VM instance 336 occurs before that particular data's asynchronous push occurs. One difficulty of the scenario described in such an embodiment is that disk 346 may contain all sorts of data, not just the missing data that should have been captured by the asynchronous push. In this way, missing data may be mixed in with data that has in fact been properly pushed to logging and telemetry services 224. Therefore, if a recovery team of the cloud provider network 120 attempts to manually recover missing data from disk 346 upon the failure of VM instance 336 (according to previous techniques used before the option of a disk recycler system 210), they will have to somehow figure out what data from disk 346 actually went missing amidst the failure at (4). As discussed with FIG. 3B, in the absence of a disk recycler system 210, the logging and telemetry services 224 will suffer from an LAT data gap in their metrics and logs, which could result in any number of the serious consequences to the customer and the cloud service provider discussed earlier in this disclosure.

The trigger event (4) of FIG. 3C differs from the trigger event (3) of FIG. 3B in the fact that at (4), VM instance 336 is not even accepting customer traffic 310 or writing to disk 346 anymore. Instead, it has stopped functioning entirely. In some ways, the failure of (4) is a more detectable failure than the failure at (3), due to the fact that VM instance 336 at (3) still has the capacity to write data to disk 346, thus appearing from some viewpoints to be functioning as expected. In this way, the "partial failure" of FIG. 3B at (3) may end up causing more issues than the "total failure" of FIG. 3C at (4) due to its lesser likelihood of detection. Further, the partial failure at (3) may go undetected for a long span of time, all the while continuing to process customer traffic 310 that, although written to the disk, never gets passed along to the appropriate logging and telemetry services 224. Notably, there are many other possible scenarios that can create a failure outside of the examples explicitly discussed within this disclosure. For example, a misconfiguration of an instance may occur due to a programming error in the code. In this scenario, the instance is functioning as instructed (in the sense that it is executing the code provided to it), however, because it was provided with faulty instructions within the code or configuration, its resulting behavior still results in a "failure," or potential loss of data. In some embodiments, as will be portrayed later on in the discussion of FIG. 4B, addressing a failure due to a misconfiguration such as the one described in this scenario may include using a persistent disk recycler system 210 to capture and upload operational data every time a disk destructed, deallocated, or otherwise recycled.

Further, scenarios exist in which an asynchronous push may be delayed for a period of time due, but then eventually successfully complete its asynchronous push. For example, an instance may run into an issue in which it is not able to conduct its asynchronous push of operational data for several hours, but then afterwards, the issue is resolved and the asynchronous push is completed. In such an example, a delayed but successful asynchronous push of operational data may not even be considered a failure, and thus a disk recycler system 210 may or may not even be used to capture the delayed data.

As previously discussed, failures such as (3) and (4) are usually rare even at the scale of large cloud provider networks 120, but with massive scale comes the likelihood that even rare triggers will happen at some point. As will now be discussed in more detail in the following figures, a disk recycler system 210 may mitigate trigger events like (3) and (4) in a number of different ways.

Figure 3D:
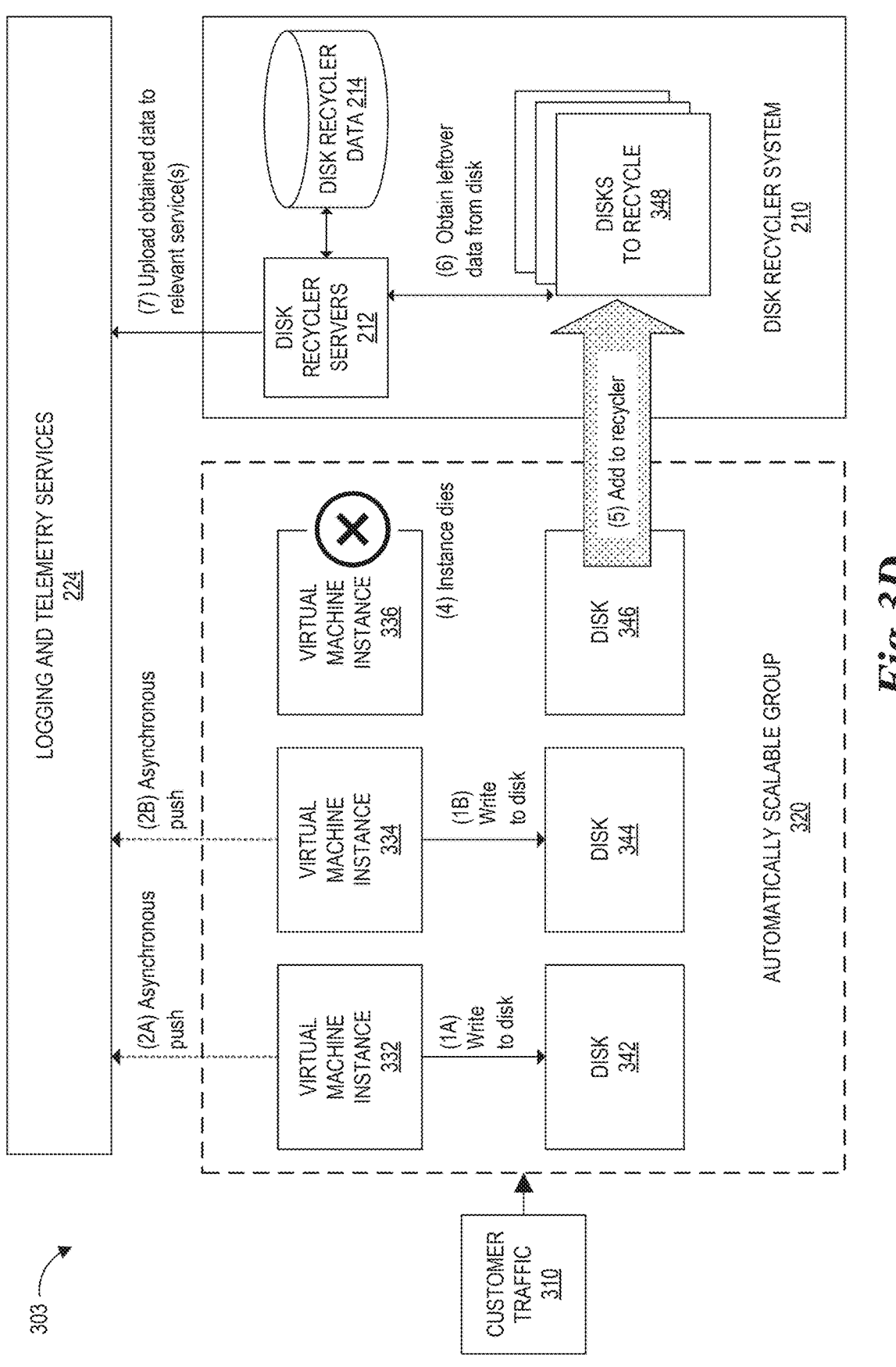
FIG. 3D depicts illustrative interactions for recycling a block storage volume disk storing log and telemetry data from a virtual machine instance that died before asynchronously pushing such data to relevant services, according to embodiments of the present disclosure.

Turning now to FIG. 3D, system 303 depicts illustrative interactions for implementing a disk recycler system 210 in the context of an exemplary trigger event such as the failure described above in FIG. 3C, according to embodiments of the present disclosure. While FIG. 3D depicts a particular example of one type of trigger event, namely the failure at (4) in which VM instance 336 dies, other embodiments not pictured may handle other triggers and implement variations of the solution depicted. Such embodiments will be discussed in more detail below.

In FIG. 3D, VM instances 332 and 334 function properly in the exact same manner discussed above in FIGS. 3A-3C (namely, both instances function properly and as expected). Thus steps (1A), (1B), (2A), and (2B) remain unchanged in FIG. 3D. However, when VM instance 336 dies at (4), as described earlier in the context of FIG. 3C, the implementation of the disk recycler system 210 present in FIG. 3D changes the sequence of events in system 303. After VM instance dies at (4) leaving leftover data written to disk 346 that did not get pushed asynchronously to the logging and telemetry services 224, the disk recycler system 210 responds to this trigger event at (5) by adding disk 346 to its list of disks to recycle 348 by the disk recycler system 210. In this way, a trigger event such as (4) initiates the first action (5) of the disk recycler system 210 in some embodiments.

At (6) of FIG. 3D, the disk recycler system 210 obtains leftover data from disk 346 after it has been designated among disks to recycle 348. Specifically, the disk recycler servers 212 make use of configuration information provided by the customer (not pictured, but discussed in more detail below) to identify and obtain the leftover data (including LAT data) that still needs to pushed to the logging and telemetry services 224 due to the failure of VM instance 336. This leftover data can be considered operational data 214. At (7), the disk recycler system 210 uploads the obtained operational data 214 from step (6) to the logging and telemetry services 224. After the completion of (7), the disk recycler system 210 may safely delete the recovered data from disk 346. At this point, the disk recycler system 210 is now free to conduct its eponymous task, recycling the disk for further use in the cloud network 120. To recycle the disk for future use, the disk recycler system 210 makes the data of the disk securely inaccessible (e.g., through methods such as overwriting, destroying encryption keys, etc.), and then that storage space where the data has been made inaccessible becomes available for allocation to another disk.

In an alternative embodiment of FIG. 3D not pictured, the disk recycler system 210 may respond to other triggers, such as (3) from FIG. 3B. In yet another embodiment of FIG. 3D, the disk recycler system 210 does not respond to a trigger at all, but rather runs persistently as a service on disks 342, 344, and 346. In such an embodiment, VM instances 332, 334, and 336 may no longer even have to conduct asynchronous pushes of data to logging and telemetry services 224. Instead, this persistent embodiment of the disk recycler system 210 takes over the responsibility of obtaining and subsequently pushing all data from the disks to logging and telemetry services 224 directly before eventually recycling the disks for further use. In some use cases, this persistent embodiment of the disk recycler system 210 may provide advantages over a model in which LAT data is pushed asynchronously to the logging and telemetry services 224. For example, a persistent disk recycler system 210 may reduce the processing required by a customer's VM instance (e.g., VM instance 332). This is because when a dedicated, persistent disk recycler system 210 handles the functionality required to support the logging and telemetry services 224, the VM instance (e.g., VM instance 332) no longer has to juggle this responsibility as a network-accessible microservice. Instead, logging becomes a fundamental functionality of the VM hosting service. As an additional benefit, the alternative embodiment of a persistent disk recycler system 210 reduces the previous resource demand on the VM instance to configure logging and manage asynchronous scheduling tasks.

Figure 4A:
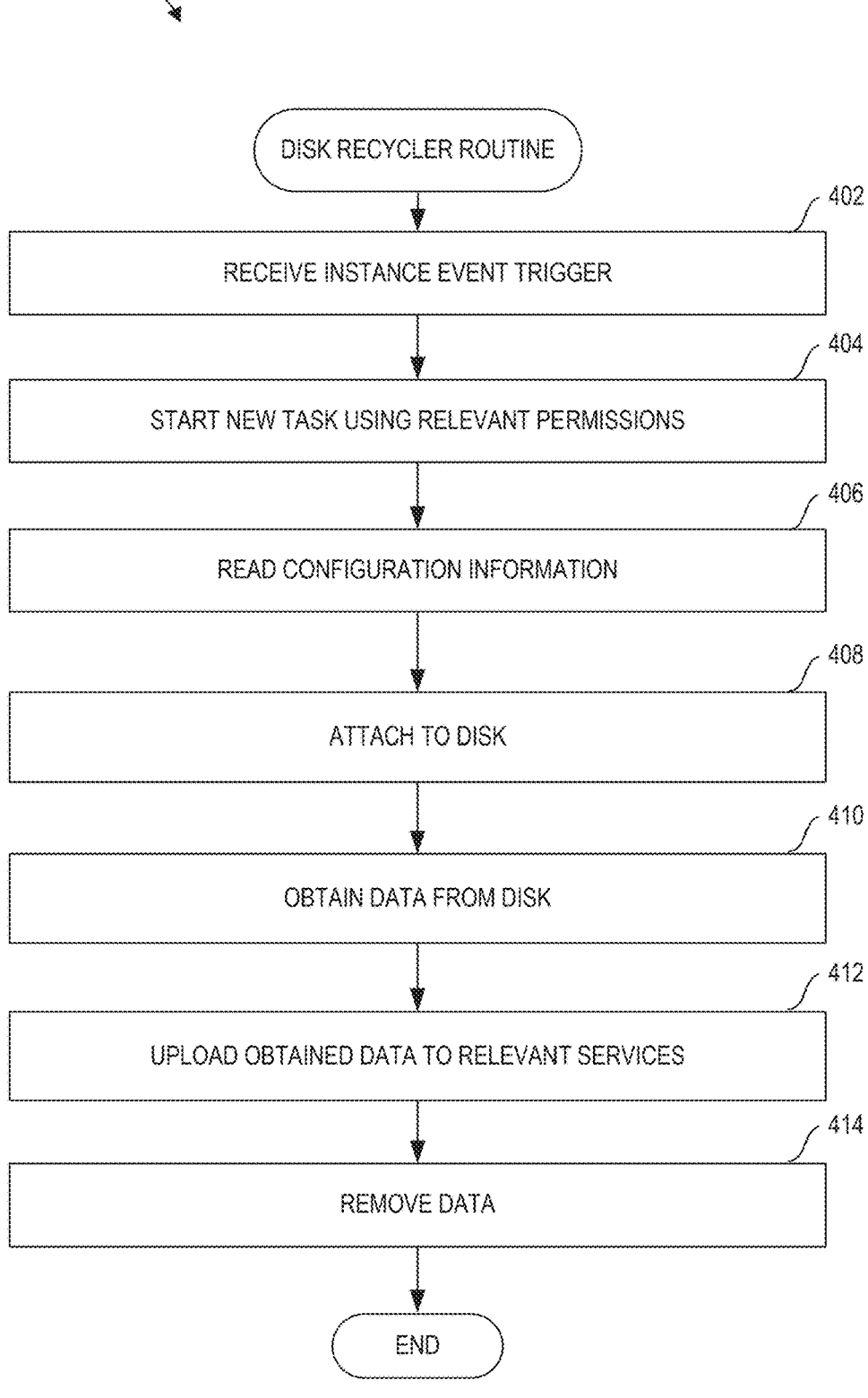
FIG. 4A depicts an illustrative routine of a disk recycling system of FIG. 3D to obtain leftover logging and telemetry data written to a disk by a virtual machine instance and upload the obtained data to relevant services before deleting the uploaded data, according to embodiments of the present disclosure.

Turning now to FIG. 4A, an illustrative routine is described in which the disk recycling system pictured in FIG. 3D obtains leftover data written to a disk by a VM instance and uploads the obtained data to relevant services before deleting the uploaded data, according to embodiments of the present disclosure. For purposes of explanation, routine 400 in FIG. 4A will be described in the context of FIG. 3D, but such context is not intended to limit routine 400 to the specifics contained within FIG. 3D.

The example disk recycler routine 400 of FIG. 4A begins at block 402, where the disk recycler system 210 receives an event trigger notification from a VM instance (e.g., the trigger event "(4)" in which VM instance 336 dies). At block 404, in response to the trigger at 402, the disk recycler system 210 starts a new disk recycler task using the relevant permissions provided for that task. In some embodiments, the disk recycler system 210 obtains any relevant permissions required to start a task, read configuration information, access or attach to the disk, read from the disk, obtain data from the disk, and delete data from the disk. In some embodiments, the permissions of block 404 may be obtained concurrently with any of the blocks of routine 400, not just at block 404, and this gathering of permissions by the disk recycler system 210 may occur at multiple points in routine 400.

In some embodiments, the new task of block 404 may be launched within the customer account corresponding to the VM instance (e.g., VM instance 336) that originally wrote the data to the disk (e.g., disk 346). By launching the task within the customer account, the disk recycler system 210 provides additional trust and security for the customer data (e.g., LAT data) involved with the task. This is because launching the task within the customer account limits the ability of the disk recycler system 210 to expose this customer data to other parties.

With the appropriate permissions in place, at block 406, the disk recycler system 210 reads configuration information provided by the customer. In some embodiments, configuration information may contain a directory path the disk recycler system 210 must use, a service or set of services that particular data should be uploaded to, the location particular data should be uploaded to, Regex rules, user-defined rules specifying matching data, or other filters for specific types of files to locate, and/or information about how to transform data that the disk recycler system 210 may obtain. In this way, configuration information provides the disk recycler system 210 with the customer input required to conduct its tasks within routine 400. In some embodiments, block 406 may happen as a concurrent step with block 404. In other embodiments, configuration information may be read by the disk recycler system 210 concurrently with any of the other blocks of routine 400 rather than manifesting as its own step at block 406.

At block 408, the disk recycler system 210 attaches to the disk involved with the event trigger (e.g., disk 346). Within the cloud provider network architecture in some embodiments, multiple virtual machine instances 116 may be able to attach to a single disk (i.e., block storage volume 106) with full read and write permissions, allowing for concurrent write operations to be performed by the virtual machine instances 116. This feature allowing multiple attachments to a single disk permits, for example, both VM instance 336 and the disk recycler system 210 (implemented on a VM instance of its own) to simultaneously attach to disk 346.

At block 410, after attaching to the disk, the disk recycler system 210 may now obtain data from the disk (e.g., the leftover data, including LAT data, written to disk 346 by VM instance 336 before its death at step "(4)"). Then at block 412, the disk recycler system 210 uploads the obtained data from block 410 to the relevant services (e.g., LAT data is uploaded to the logging and telemetry services 224). After completion of block 412, the disk recycler system is now free at block 414 to remove the data uploaded in block 412. In some embodiments, removing data at block 414 may include deleting the uploaded data from the disk (e.g., disk 346). In other embodiments, data removal of block 414 includes deleting the disk itself (e.g., disk 346). Upon removing the data at block 414, routine 400 concludes.

As previously mentioned, a disk recycler system 210 does not have to respond to specific trigger events, spun up as an instance to address data on a particular disk, as just described in example routine 400. In other embodiments, such as the routine 420 described in FIG. 4B, the disk recycler system may instead be implemented as a persistent service running on disks in the cloud provider network 120. In routine 420, VM instances may not have to conduct asynchronous pushes of data to relevant services. Instead, this persistent embodiment of the disk recycler system 210 takes over the responsibility of obtaining and subsequently pushing all data from the disks to relevant services 224 directly before eventually recycling the disks for further use.

Figure 4B:
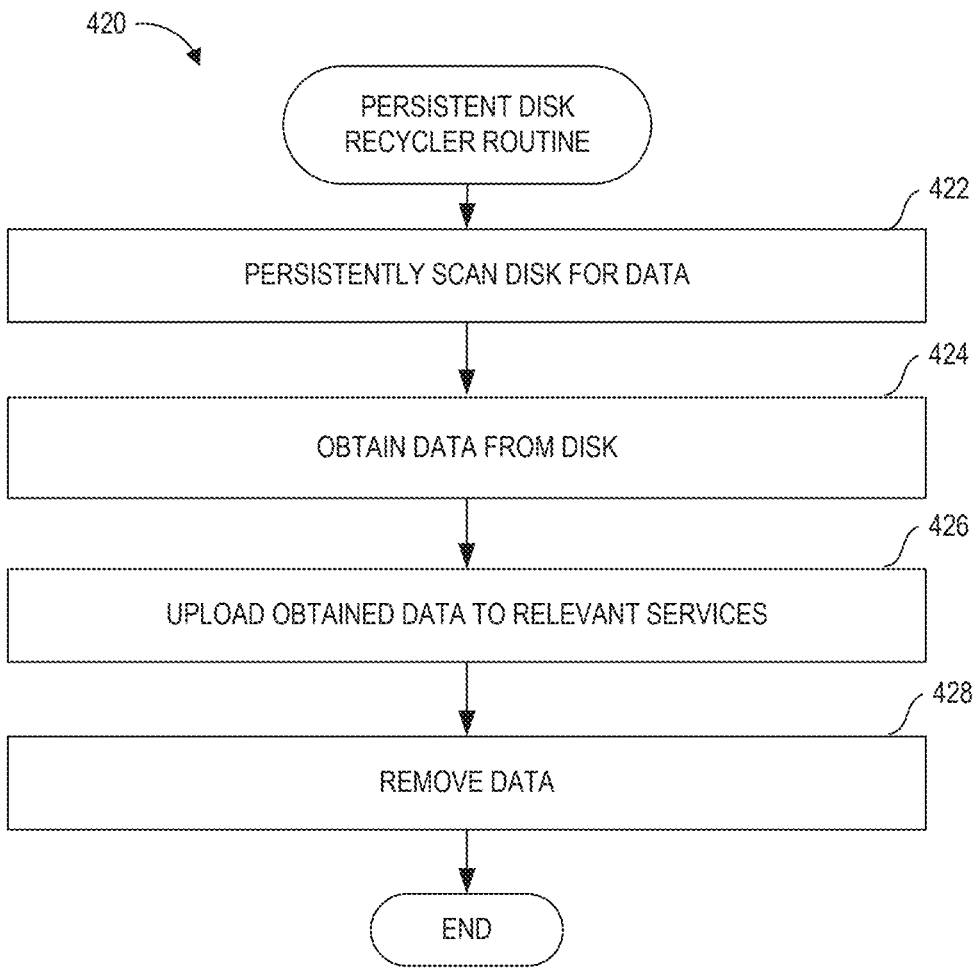
FIG. 4B depicts an illustrative routine of a persistent disk recycling service used to continually obtain logging and telemetry data from block storage volume disks and upload obtained data to relevant services before deleting the uploaded data, removing the need for the virtual machine instance to asynchronously push such data to the relevant services, according to embodiments of the present disclosure.

Turning now to FIG. 4B, another example routine 420 begins at block 422, in which the dedicated service of the disk recycler system 210 persistently (or with some otherwise continuous or periodic basis or cadence) scans the disks of the cloud provider network 120 for data written to the disks (block storage volumes 106) by VM instances 116. At block 424, upon discovery of data on a disk, the disk recycler system 210 obtains data (operational data 214) from the disk with disk recycler servers 212. Then at block 426, the disk recycler system uploads the data obtained at block 424 to the relevant services of the cloud provider network 120. Thus at block 428, the data from the disk has been safely delivered to its appropriate destination at the relevant services, and the disk recycler system 210 may safely remove the data. In some embodiments, this may include deleting data from the disk. In other embodiments, it may mean deleting the disk itself. In still other scenarios, it may mean deallocation of the disk. Upon completion of removal of the data at block 428, routine 420 is complete.

Routine 420 may be modified to include many of the additional elements of routine 400. For example, routine 420 may also include a step such as block 408, in which the disk recycler task is attached to the disk. In other embodiments, routine 420 may include part of routine 400's block 404 in which permissions are obtained by the disk recycler system 210 (e.g., from within a customer account, or otherwise provided through customer input in order to maintain security and encryption).

In both routine 400 and routine 420, information regarding data deduplication (determining which data on the disk is redundant and already reported to relevant services, versus which data on the disk is currently missing from the relevant services) may be handled by the relevant services themselves (a feature that may be already present before the introduction of the disk recycler system 210). Further, flags may be used by these relevant services to mark data as "amended" once the disk recycler system 210 has amended any data in a log, and time stamps may be provided be provided by the disk recycler system 210 in order to provide the relevant services a reference point in time for various activities conducted by the disk recycler system 210.

Figure 5:
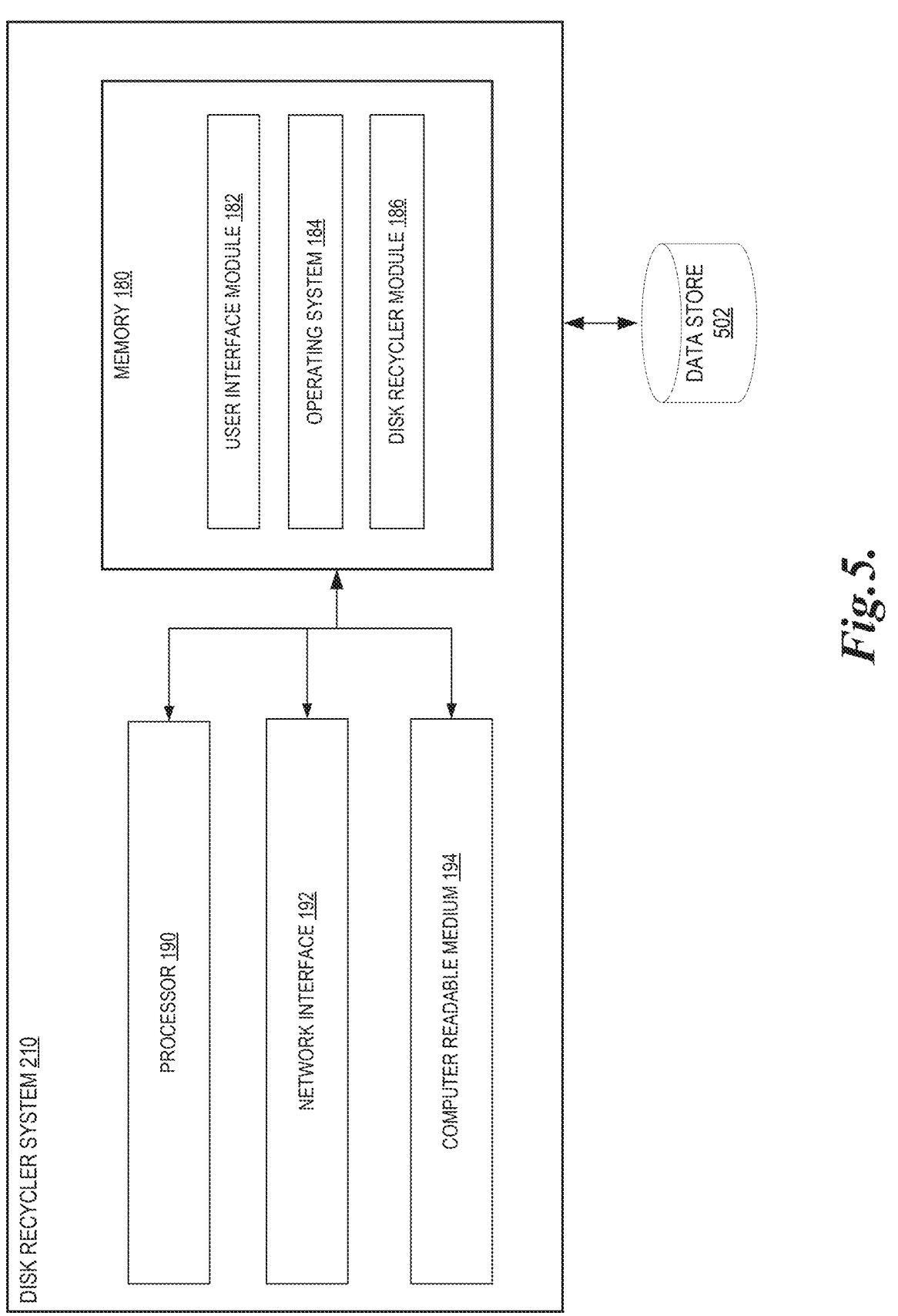
FIG. 5 depicts an example architecture of a computing device or system that can be used to perform disk recycling in accordance with aspects of the present disclosure.

FIG. 5 depicts an example architecture of a computing system (referred to as the disk recycler system 210) that can be used to perform one or more of the techniques described herein or illustrated in FIGS. 1-4B. The general architecture of the disk recycler system 210 depicted in FIG. 5 includes an arrangement of computer hardware and software modules that may be used to implement one or more aspects of the present disclosure. The disk recycler system 210 may include many more (or fewer) elements than those shown in FIG. 5. It is not necessary, however, that all of these elements be shown in order to provide an enabling disclosure. As illustrated, the disk recycler system 210 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104 illustrated in FIGS. 1 and 2.

The processor 190 may also communicate with memory 180. The memory 180 may contain computer program instructions (grouped as modules in some embodiments) that the processor 190 executes in order to implement one or more aspects of the present disclosure. The memory 180 may include random access memory (RAM), read only memory (ROM), and/or other persistent, auxiliary, or non-transitory computer readable media. The memory 180 may store an operating system 184 that provides computer program instructions for use by the processor 190 in the general administration and operation of the disk recycler system 210. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device.

In addition to and/or in combination with the user interface module 182, the memory 180 may include a disk recycler module 186 that may be executed by the processor 190. In one embodiment, the disk recycler module 186, when executed, implements various aspects of the present disclosure, e.g., scanning for LAT data on disks, scraping LAT data from disks, uploading LAT data obtained from disks to the respective services, recycling disks, and/or other aspects discussed herein or illustrated in FIGS. 1-4B.

In addition, the memory 180 may include or communicate with one or more data stores, such as the data store 502, which may be any persistent or substantially persistent data store (e.g., one or more hard disk drives, solid state drives, network accessible storage, a storage area network, or any number of data stores known in the art). The data store 502 may illustratively store operational data 214.

While the disk recycler module 186 is shown in FIG. 5 as part of the disk recycler system 210, in other embodiments, all or a portion of the disk recycler module 186 may be implemented by other components of the cloud provider network 120 and/or another computing device. For example, in certain embodiments of the present disclosure, another computing device in communication with the cloud provider network 120 may include several modules or components that operate similarly to the modules and components illustrated as part of the disk recycler system 210. In some instances, the disk recycler system 210 may be implemented as one or more virtualized devices, such as one or more instances 116 on the compute servers 115. Moreover, as noted above, the disk recycler system 210 may be implemented in whole or part as a distributed computing system including a collection of devices that collectively implement the functions discussed herein.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system for managing operational data in a cloud provider environment, the system comprising:
   a storage host computing device hosting a block storage volume logically attached as virtual storage for a virtual machine instance;
   a compute host computing device hosting the virtual machine instance, wherein the compute host computing device is in communication with the storage host computing device via a network, and wherein the virtual machine instance is configured to:
      generate operational data regarding operation of the virtual machine instance;
      cause storage of the operational data in the block storage volume; and
      asynchronously transmit the operational data to a log storage service; and
   one or more computing devices implementing a disk recycling system, wherein the disk recycling system is configured to:
      receive configuration information for the operational data, wherein the configuration information identifies the log storage service to which the virtual machine instance is configured to asynchronously transmit the operational data;
      detect a failure of the virtual machine instance to asynchronously transmit the operational data to the log storage service; and
      in response to detecting the failure of the virtual machine instance to asynchronously transmit the operational data to the log storage service:
         scan the block storage volume for at least a portion of the operational data not yet transmitted to the log storage service;
         obtain the portion of the operational data from the block storage volume; and
         transmit the portion of the operational data to the log storage service.

2. The system for managing operational data of claim 1, wherein the disk recycling system is further configured to:
   launch a disk recycler task within a customer account, wherein the customer account corresponds to the virtual machine instance; and
   attach the disk recycler task to the block storage volume.

3. The system for managing operational data of claim 2, wherein the customer account provides the disk recycler task with permissions to read and write to the block storage volume.

4. The system for managing operational data of claim 1, wherein the failure of the virtual machine instance to asynchronously transmit the operational data to the log storage service includes at least one of:
   failure of the virtual machine instance;
   termination of the virtual machine instance; or
   network communication failure between the virtual machine instance and the block storage volume.

5. A computer-implemented method for reliably pushing data to remote services, the method comprising:
   attaching a block storage volume to a compute instance;
   writing data generated by the compute instance to the block storage volume, wherein the data comprises events, logs, or metrics that the compute instance is configured to asynchronously push to one or more remote services;
   upon detecting that the compute instance has stopped or been terminated, providing the block storage volume to a disk recycler service; and
   by the disk recycler service:
      scanning the block storage volume to identify a portion of the data that has not yet been pushed to any remote service;
      identifying a particular remote service to which the compute instance was configured to push the portion of the data; and
      transmitting the portion of the data to the particular remote service.

6. The method of claim 5, wherein the compute instance causes storage of the data in the block storage volume, and wherein the compute instance asynchronously transmits the data to the one or more remote services.

7. The method of claim 6, the method further comprising detecting a failure of the compute instance to asynchronously transmit the data to the one or more remote services, wherein attaching to the block storage volume, scanning the block storage volume, identifying the particular remote service, and transmitting the portion of the data are in response to detecting the failure of the compute instance.

8. The method of claim 7, the method further comprising:
   in response to detecting the failure of the compute instance to asynchronously transmit the data to the one or more remote services, launching a disk recycler task within a customer account, wherein the customer account corresponds to the compute instance;
   attaching the disk recycler task to the block storage volume; and
   receiving configuration information for the data, wherein the configuration information identifies the particular remote service to which the compute instance is configured to asynchronously transmit the data.

9. The method of claim 8, wherein the customer account provides the disk recycler task with permissions to read and write to the block storage volume.

10. The method of claim 9, wherein the disk recycler service attaches to the block storage volume while the compute instance is attached to the block storage volume.

11. The method of claim 5, the method further comprising deallocating resources of the block storage volume.

12. One or more non-transitory computer-readable media comprising instructions for reliably pushing data to remote services executable by one or more processors, wherein the instructions, when executed, cause the one or more processors to:

attach a block storage volume to a compute instance;

write data generated by the compute instance to the block storage volume, wherein the data comprises events, logs, or metrics that the compute instance is configured to asynchronously push to one or more remote services;

upon detecting that the compute instance has stopped or been terminated, provide the block storage volume to a disk recycler service; and by the disk recycler service:

scan the block storage volume to identify a portion of the data that has not yet been pushed to any remote service;

identify a particular remote service to which the compute instance was configured to push the portion of the data; and transmit the portion of the data to the particular remote service.

13. The one or more non-transitory computer-readable media of claim 12, wherein the compute instance causes storage of the data in the block storage volume, and wherein the compute instance asynchronously transmits the data to the one or more remote services.

14. The one or more non-transitory computer-readable media of claim 13, wherein the instructions, when executed, further cause the disk recycler service to detect a failure of the compute instance to asynchronously transmit the data to the one or more remote services, wherein attaching to the block storage volume, scanning the block storage volume, identifying the particular remote service, and transmitting the portion of the data are in response to detecting the failure of the compute instance.

15. The one or more non-transitory computer-readable media of claim 14, wherein the instructions, when executed, further cause the disk recycler service to:

in response to detecting the failure of the compute instance to asynchronously transmit the data to the one or more remote services, launch a disk recycler task within a customer account, wherein the customer account corresponds to the compute instance;

attach the disk recycler task to the block storage volume; and receive configuration information for the data, wherein the configuration information identifies the particular remote service to which the compute instance is configured to asynchronously transmit the data.

16. The one or more non-transitory computer-readable media of claim 15, wherein the customer account provides the disk recycler task with permissions to read and write to the block storage volume.

17. The one or more non-transitory computer-readable media of claim 16, wherein the disk recycler service attaches to the block storage volume while the compute instance is attached to the block storage volume.

18. The one or more non-transitory computer-readable media of claim 17, wherein the data includes at least one of: compliance data, governance data, auditing data, user activity data, log data, metrics, analytics, or security data.

19. The one or more non-transitory computer-readable media of claim 12, wherein resources of the block storage volume are deallocated.

20. The one or more non-transitory computer-readable media of claim 15, wherein the configuration information further identifies at least one of:

information regarding transformation of the data;

user-defined rules specifying matching data;

a directory address for the block storage volume, wherein the directory address represents a location of the data on the block storage volume; or a destination address for the particular remote service.

\* \* \* \* \*